United States Patent [19]

Olstowski

[11] 4,036,820

[45] July 19, 1977

[54] NON-CATALYTIC PROCESS FOR PREPARING RAPID-SETTING RIGID POLYURETHANES

[75] Inventor: Franciszek Olstowski, Freeport, Tex.

[73] Assignee: The Dow Chemical Company, Midland, Mich.

[21] Appl. No.: 704,861

[22] Filed: July 12, 1976

[51] Int. Cl.² ............................................. C08G 18/28
[52] U.S. Cl. ................. 260/77.5 AM; 260/77.5 AB; 260/77.5 AP
[58] Field of Search ............ 260/77.5 AB, 77.5 AM, 260/77.5 AP

[56] References Cited

U.S. PATENT DOCUMENTS 3,635,904  1/1972  Briggs et al. ................. 260/77.5 AP
3,689,442  7/1972  Taub .............................. 260/77.5 AP

OTHER PUBLICATIONS

"Chemistry" by Sienko and Plane, pp. 237–249, McGraw-Hill Book Co. Inc. 1961.

*Primary Examiner*—Eugene C. Rzucidlo
*Attorney, Agent, or Firm*—James G. Carter

[57] ABSTRACT

A process is described for preparing rapid-setting polyurethanes which comprises admixing in the absence of a catalyst a liquid polyol component with a liquid polyisocyanate component wherein the temperature of said components prior to mixing is such that the resultant mixture has a temperature of at least 50° C and will result in a peak exotherm temperature of at least 85° C.

8 Claims, No Drawings

NON-CATALYTIC PROCESS FOR PREPARING RAPID-SETTING RIGID POLYURETHANES

FIELD OF THE INVENTION

The present invention relates to a process for the preparation of rapid-setting polyurethanes in the absence of a catalyst.

BACKGROUND OF THE INVENTION

Rapid-setting rigid polyurethanes have previously been prepared; however, such processes have required the presence of a catalyst for urethane formation, a modifier substance or both. Illustrative of such processes are U.S. Pat. No. 3,378,511; U.S. Pat. No. 3,726,827; U.S. Pat. No. 3,746,692; U.S. Pat. No. 3,773,697, U.S. Pat. No. 3,801,532; U.S. Pat. No. 3,847,859; U.S. Pat. No. 3,878,156; U.S. Pat. No. 3,787,157; U.S. Pat. No. 3,879,329; U.S. Pat. No. 3,882,071; U.S. Pat. No. 3,882,072; U.S. Pat. No. 3,883,465; U.S. Pat. No. 3,883,466; U.S. Pat. No. 3,883,484; U.S. Pat. No. 3,886,102; U.S. Pat. No. 3,886,182; and U.S. Pat. No. 3,892,705. Each of the above patents disclose a process which requires the presence of both a modifier compound and a catalyst for urethane formation in order to prepare rapid-setting polyurethanes except U.S. Pat. No. 3,773,697 and U.S. Pat. No. 3,726,827, which do not require the presence of a modifier and additionally, U.S. Pat. No. 3,773,697, requires a fluid quench step after solidification. A copending application, Ser. No. 405,244 filed Oct. 10, 1973, now U.S. 4,001,166 of which the applicant herein is an applicant therein discloses a process for preparing rapid-setting polyurethanes without a catalyst; however, an amine-containing polyol and a modifier are required. Also, another copending application Ser. No. 456,093 filed Mar. 29, 1974, now U.S. Pat. No. 4,008,185 which the applicant herein is the applicant therein discloses a process for preparing rapid-setting polyurethanes without a catalyst; however, a non-amine, nitrogen-containing compound such as an amide is required to be present as a modifier.

DETAILED DESCRIPTION OF THE INVENTION

A process has now been discovered for preparing rigid, non-cellular rapid-setting polyurethane compositions which can be demolded within about 15 minutes after admixture of the components of such a polyurethane. The process of the present invention does not require the presence of a catalyst for urethane formation nor does it require a modifier compound; although such modifiers can be employed, if desired.

The process of the present invention comprises

A. admixing in the absence of a catalyst for urethane formation a first liquid component containing a polyol free of nitrogen atoms and having from about 2 to about 8 hydroxyl groups per molecule or mixture of such polyols and an OH equivalent weight of from about 30 to about 200, preferably from about 50 to about 180 with a second liquid component containing an aromatic polyisocyanate having at least two NCO groups per molecule or mixture of such polyisocyanates with the proviso that when said first component contains a polyol substance or mixture of such substances wherein the average number of hydroxyl groups per molecule is less than about 2.5, then said second component contains an aromatic polyisocyanate or mixture of such polyisocyanates wherein the average number of NCO groups per molecule is at least about 2.5;

B. placing the resultant mixture into a suitable mold wherein said mixture solidifies within about 15 minutes to a solid having density of at least about 1 g/cc and a percent elongation of less than about 100; and C. subsequently demolding the resultant article from the mold;

wherein the temperature of said first and second components at the time of mixture is such that the temperature of the resultant mixture is at least about 50° C and preferably at least about 60° C and is sufficient to provide a peak exotherm temperature of at least about 85° C, preferably at least about 100° C and wherein said first and second components are admixed in such proportions that the resultant NCO:OH equivalent ratio is from about 0.75:1 to about 1.5:1 and preferably from about 0.90:1 to about 1.2:1.

The non-catalytic process of the present invention provides for urethane formation by heating either, or both components to a temperature above that which may be called an initiating temperature prior to mixing. In general, if both the polyol and polyisocyanate are preheated, they are usually preheated to about 50° C or higher.

If it is desired to heat only one component and the other component is at ambient temperature (i.e., 20°–30° C) then the heated component usually has a temperature of at least about 100° C just prior to admixing. Of course, if one of the components is at a temperature below about 20° C, then the heated component must be increased in temperature by at least an amount to compensate for the lack of heat in the cooler reactant.

Since polyisocyanates can commonly show slow changes in isocyanate equivalent weight upon prolonged heating to temperature necessary for this process, it may be preferable to maintain the isocyanate component at ambient temperature or slightly higher and to maintain the polyol component at an adequately high temperature (i.e., ≧100° C). It may also be equally preferable to maintain both components at the "mean" heated temperature (i.e., above about 50° C).

Generally, polyols having an equivalent weight below 100 will appear to yield solidified products at lower reactant temperatures whereas polyols having an equivalent weight of about 150 or higher may require higher temperatures of the reactant mixture. Also, polyols having primary hydroxyls will require lower reactant temperatures than those polyols having secondary hydroxyls.

Generally, also, more rapid solidification results from high initiating temperatures. However, if a polymerization exotherm greatly exceeds about 200° C then unwanted voids or fissures may appear in the casting. The prevention or minimization of the development of voids or fissures and thermal control can usually be achieved by the addition of a liquid modifier and/or the use of an isocyanate terminated prepolymer.

A secondary requirement for the non-catalytic process to polymerize the reactants into an adequately cured resin casting is that the polymerizing mass must exhibit an exotherm temperature exceeding about 85° C. Although the polyol and polyisocyanate reactants may be heated about 50° C, this heated mixture may be poured into a thick metal mold having a high thermal conductivity and a high thermal capacity relative to the heated reactants. If this mold removes enough heat to prevent the polymerizing mass to exhibit an exotherm above 85° C, the resin product will usually exhibit very poor mechanical strength. In another instance, a sufficiently preheated component, after admixing, may be deposited in such a thin layer (e.g., a ⅛-inch or less) that heat losses will prevent the polymerization exotherm from exceeding a temperature of about 85° C and again the resultant resin will exhibit unacceptable mechanical properties.

The suitably preheated reactants, after adequate blending, and upon pouring into suitable molds will rapidly polymerize into polyurethane castings which solidify and are capable of being demolded within 15 minutes after admixture without further need for oven cure. This process has the advantage over U.S. Pat. No. 3,378,511 in that a rapid-setting resin casting exhibiting excellent strength can be obtained without the use of a plasticizer and the advantage over U.S. Pat. No. 3,726,827 is that high strength castings can be obtained without the requirement of forming a prepolymer.

The polyols useful in this process have a hydroxyl functionality of 3 to 8 and a hydroxyl equivalent weight of about 200 or less, preferably less than about 180. However, a diol of the same equivalent weight range may be used if the polyisocyanate has an average functionality of at least about 2.5. The polyols, just prior to blending with the isocyanate reactant must be in liquid form Suitable such polyols which can be employed in the present invention include, for example, those described in U.S. Pat. No. 3,886,182 and U.S. Pat. No. 3,892,705 and so much of said patents as pertains to such polyols having a functionality of 2 to 8 and free of nitrogen atoms are incorporated herein by reference.

The polyisocyanates useful in this process are limited to the aromatic polyisocyanates wherein the -NCO group is directly attached to the phenyl ring (aromatic nucleus). Commonly known aliphatic polyisocyanates such as isophorone diisocyanate or xylylene diisocyanate do not exhibit the non-catalytic polymerization when mixed with the polyols employed herein.

Suitable such polyisocyanates which can be employed in the present invention include, for example, those aromatic polyisocyanates described in U.S. Pat. No. 3,886,182 and U.S. Pat. No. 3,892,705 and so much of said patents as pertains to such polyisocyanates and prepolymers thereof are included herein by reference.

The use of a high boiling liquid (>150° atmospheric boiling point), non-reactive modifier is optional in the process of the present invention and can be incorporated into the reactive mixture up to about 35 weight percent of the total formulation. However, the presence of the liquid modifier can tend to increase the time required to demold the cast polyurethane object. To overcome this undesirable effect, the modifier when added in substantial amounts may have to be heated to temperatures of 100° C or higher.

Solid particulated inorganic and organic modifiers can also be employed such as, for example, sand, marble dust, iron oxide powders, alumina, silicon carbide, polyolefin powders, powdered rosin, polyurethanes and the like.

Said modifier components can be employed in admixture with either of the previously described polyols or polyisocyanates or when in liquid form they can be employed as a separate third component.

Other additives such as mold release agents, fire retarding agents, coloring agents, agents to impart electrical and/or thermal conductivity characteristics, agents to impart magnetic properties and the like may also be employed in the present invention; however, such resultant mixture would be subject to the temperature and maximum exotherm limitations set forth herein.

The resultant products prepared by the process of the present invention can be post-cured at elevated temperatures if desired, to enhance or improve certain properties such as, for example, heat distortion temperature, flexural modulus, surface hardness and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, combinations thereof and the like.

It is preferred to employ relatively thin wall molds having a low heat capacity or thermal conductivity. Heavy molds made of relatively high thermal conductivity materials such as aluminum, copper, iron, or steel and the like may present curing problems, i.e., the reactants may not be readily demolded unless the mold is preheated to about 50°-90° C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, electrical insulators, recreational equipment such as, for example, gold clubs, skate boards and the like, wheels, pulleys, fire hose nozzles, industrial trench covers, manhole covers, electrical junction boxes, tanks as vessels, pump bases and the like.

The following examples are illustrative of the present invention but are not to be construed as to limiting the scope thereof in any manner.

The following polyols and polyisocyanates were employed in the examples.

POLYOL A was an adduct of glycerine and propylene oxide, said adduct having a hydroxyl equivalent weight of about 87.

POLYOL B was an adduct of glycerine and propylene oxide, said adduct having a hydroxyl equivalent weight of about 150.

POLYOL C was an adduct of sucrose and propylene oxide, said adduct having a hydroxyl equivalent weight of about 161.

POLYOL D was dipropylene glycol (eq. et. = about 67).

POLYOL E was polyoxyethylene glycol having an OH equivalent weight of about 150.

POLYOL F was a polyester diol prepared from an aromatic dibasic acid and a long chain glycol said polyester diol having an OH equivalent weight of about 195 and being commercially available from the Ruco Div. of Hooker Chemical Company as Rucoflex R-109-270.

POLYOL G was an adduct of glycerine and propylene oxide, said adduct having a hydroxyl equivalent weight of about 232.

POLYISOCYANATE A was an 80/20 mixture by weight of 2,4-/2,6-toluenediisocyanate having an NCO equivalent weight of about 87.

POLYISOCYANATE B was an adduct (quasi-prepolymer) of Polyol A and Polyisocyanate A, said adduct containing about 30% to 32% by weight free NCO groups and having an NCO equivalent weight of about 131.

POLYISOCYANATE C was a polymethylene polyphenylisocyanate having an average functionality of about 2.16–2.8 and an NCO equivalent weight of about 134.

POLYISOCYANATE D was diphenylmethane diisocyanate having an NCO equivalent weight of about 125.

POLYISOCYANATE E was isophorone diisocyanate having an NCO equivalent weight of about 111.

POLYISOCYANATE F was hydrogenated methylenediphenyl diisocyanate having an NCO equivalent weight of about 132.

POLYISOCYANATE G was xylylene diisocyanate having an NCO equivalent weight of about 94.

EXAMPLE 1

Preheated a container of Polyol A to a temperature of 135° C, then poured 100 grams of this polyol into a beaker. Next, poured 100 grams of Polyisocyanate A that was maintained at room temperature (~24° C) into the same beaker and rapidly stirred this blend of polyol and polyisocyanate. This blend, which had an NCO:OH ratio of 1:1, was poured into a Mylar tray and solidification of this blend was found to occur in about 70 seconds after start of stirring. The exotherm of this polymerization reaction was at least 170° C. A transparent resin sheet (~⅛-inch thick) was removed from the Mylar tray in less than 2½ minutes after start of mixing. This sheet was found to exhibit a density greater than 1 gram per cc, a Barcol Hardness (No. 934-1 tester) value of about 40 and a tensile strength of 9803 psi (690.15 kg/cm$^2$) at an elongation of 12%.

EXAMPLE 2

Poured out 45 grams of Polyisocyanate A maintained at 90° C, then rapidly stirred in 45 grams of Polyol A which had been maintained at 90° C. This hot blend, which had an NCO:OH ratio of 1:1, was poured into a room temperature mold of Mylar and observed that solidification occurred within three minutes after start of mixing. A transparent resin sheet was removed from the Mylar mold in less than six minutes after start of mixing. When the casting had cooled to room temperature, it was found to have a density greater than 1 gram/cc and a Barcol Hardness (No. 934-1 tester) value of 36.

EXAMPLE 3

Preheater 70 grams of Polyisocyanate A to 95° C in an oven; poured this hot polyisocyanate into a 250 cc polyethylene beaker. The temperature of the polyisocyanate just prior to polyol addition was 90° C. Then added 70 grams of Polyol A that had been maintained at 25° C. Rapidly stirred this polyol and polyisocyanate blend, which had an NCO:OH ratio of 1:1, for about 20 seconds (the murky blend at this point became clear) and then the blend was poured out into a Mylar tray within 60 seconds after start of mixing. The blend solidified into a treatment resin between the 4th and 5th minutes after start of mixing. The maximum temperature reached by the polymerization exotherm of this casting was 152° C. A transparent sheet was removed from the Mylar mold in about 10 minutes after start of mixing and this resin sheet (~5/16-inch thick) was found to have a density greater than 1 gram/cc and a Barcol Hardness (No. 934-1 tester) value of about 35.

EXAMPLE 4

Blended 45 grams of Polyisocyanate A preheated to 50° C with 45 grams of Polyol A preheated to 65° C and poured this blend, which had an NCO:OH ratio of 1:1, into a 250 cc polyethylene beaker. Within 1 minute, this liquid blend had a temperature of 100° C, in two minutes after start of mixing the liquid blend reached a temperature of 140° C. In about three minutes this casting had solidified and in about four minutes, this solidified casting was demolded. This 1-inch thick cast slug had a density of >1 g/cc.

EXAMPLE 5

Blended 45 grams of Polyisocyanate B prepolymer (containing 30 wt. % NCO) that had been heated to about 100° C with 30 grams of Polyol A that had been heated to about 100° C. Poured this blend, which had an NCO-OH ratio of 1:1, into a 250 cc polyethylene beaker and noted that this blend solidified in about 2 minutes. A solid transparent resin slug was removed from the polyethylene beaker in about 5 minutes after start of mixing. This rigid polymer casting had a density greater than 1 gram/cc.

EXAMPLE 6

These three ingredients: Polyisocyanate A, Polyol A, and dioctyl phthalate (DOP) modifier were heated in separate containers in an oven to 100° C. Then 30 grams of each of these preheated ingredients were rapidly mixed together at ambient conditions and poured into a 250 cc polyethylene beaker. This blend, which had an NCO:OH ratio of 1:1, started to turn opaque white in about two minutes after start of mixing. Within four minutes this casting solidified and turned completely opaque white. A solid white slug was removed from the polyethylene mold in about 12 minutes after start of mixing. This slug had a density greater than 1 g/cc.

EXAMPLE 7

Blended 100 grams of a 50/50 wt. % mixture of Polyol A and DOP that had been preheated to about 115° C with 50 grams of Polyisocyanate A that had been stored at room temperature. This blend, which had an NCO:OH ratio of 1:1, was then poured into a Mylar tray. Solidification of this casting occurred in about 30 seconds after the start of stirring. The solid resin turned opaque white. The polymerization exotherm caused the casting to reach a temperature of 148° C. This opaque white slab was removed from the Mylar tray in about three minutes after the start of mixing and was found to have a density greater than 1 gram per cc and a tensile strength of 4710 psi (331.11 kg/cm$^2$) at an elongation of 9%.

COMPARATIVE EXPERIMENT A (temperature of mixture below 50° C)

A 50/50 wt. % blend of dioctyl phthalate and Polyol A was heated in an oven at 80° C. Then 100 grams of this heated mixture was rapidly blended with 50 grams of Polyisocyanate A stored at room temperature and poured into a Mylar tray. At 2 minutes after the start of mixing, the blend, which had an NCO:OH ratio of 1:1, exhibited a temperature of 44° C. Ten minutes after start of mixing, this casting was still found to be a liquid. No solidification had occurred in 24 hours after start of mixing.

EXAMPLE 8

A preblended mixture of Polyol A and dioctyl phthalate (2:1 weight ratio) was heated to 108° C and then 120 grams of this mixture were blended with 80 grams of Polyisocyanate A stored at room temperature (~26° C). This blend, which had an NCO:OH ratio of 1:1, was poured into a Mylar tray and the casting turned into an opaque solid sheet in less than about 7 minutes after start of mixing. The polymerization exotherm reached 135° C. This casting was demolded in less than 15 minutes after start of mixing and was found to have a density greater than 1 gram/cc, a Barcol Hardness (No. 935 tester) value of 85, and a tensile strength of 5700 psi (400.71 kg/cm$^2$) at an elongation of 10%.

EXAMPLE 9

Into a beaker was poured 100 grams of Polyol B that had been preheated to 118° C and then to this was blended 65 grams of Polyisocyanate A that had been stored at room temperature. Poured this blend, which had an NCO:OH ratio of 1.12:1, into a Mylar tray and in about 2 minutes after start of mixing, the cast liquid reached a temperature of 118° C. The cast liquid reached a maximum temperature of 148° C and had solidified in less than 6 minutes after start of mixing. A 5/16-inch thick transparent resin sheet was removed from the Mylar tray in less than 10 minutes after the start of mixing. The resin product had a density greater than 1 gram/cc.

EXAMPLE 10

A blend of Polyol C (40 grams) and Polyol B (60 grams) was heated to about 115° C. To this was added 55 grams of Polyisocyanate A stored at room temperature. After rapidly stirring the mixture, it was poured into a Mylar tray. This blend, which had an NCO:OH ratio of 0.97:1, was observed to solidify in less than 4 minutes after the start of mixing. The exotherm reached a maximum temperature of 140° C. This transparent casting was demolded in less than 9 minutes after start of mixing and was found to have a density greater than 1 gram/cc and a Barcol Hardness (No. 934-1 tester) value of about 15.

EXAMPLE 11

In a beaker, 65 grams of Polyol A preheated to 115° C was blended with 100 grams of Polyisocyanate C stored at room temperature. This blend, which had an NCO:OH ratio of 1:1, required about three minutes of stirring before a compatible blend occurred. This blend was poured into a Mylar tray and was observed to solidify in less than 9 minutes after start of mixing. The maximum exotherm was observed to be about 117° C. A ⅛-inch thick resin sheet was removed from the Mylar tray in less than 13 minutes after start of mixing and was found to have a density greater than 1 gram/cc, a Barcol Hardness (No. 934-1 tester) of about 32 and a tensile strength of 12,222 psi (849.21 kg/cm$^2$) at an elongation of 21%.

EXAMPLE 12

Weighed out 50 grams of Polyol D that had been heated to 115° C and to this was rapidly stirred in 100 grams of Polyisocyanate C that had been stored at room temperature. This compatibilized blend, which had an NCO:OH ratio of 1:1, was poured into a Mylar tray. Solidification occured in less than 3 minutes after start of mixing. The maximum temperature exhibited by this polymerizing mass was about 137° C. A ⅛-inch thick resin sheet was removed from the Mylar tray in less than 6 minutes after mixing. Density of this polymer product was greater than 1 gram/cc and it exhibited a Barcol Hardness (No. 934-1 tester) between 35 and 38. This casting was found to exhibit a tensile strength of 7885 psi (554.32 kg/cm$^2$) at an elongation of 12%.

EXAMPLE 13

In a beaker, 100 grams of Polyol E preheated to 100° C was blended with 100 grams of Polyisocyanate C stored at room temperature. The blend, which had an NCO:OH ratio of 1.12:1, was stirred for 30 seconds to obtain a compatible mixture. Then this blend was poured into a Mylar tray. This cast fluid solidified in less than 6 minutes after start of mixing. The maximum exotherm was observed to be about 140° C. This casting was demolded in less than 9 minutes after mixing. This tough resin product, having a density greater than 1 gram/cc was found to exhibit a tensile strength of 2901 psi (203.94 kg/cm$^2$) at an elongation of 51%.

EXAMPLE 14

Blended 90 grams of Polyol C stored at 114° C with 75 grams of Polyisocyanate D stored at about 40° C. Poured this blend, which had an NCO:OH ratio of 1.07:1, into a Mylar tray and observed that the casting had solidified in about 3½ minutes after start of mixing. This polymerizing mass showed a peak temperature of 127° C. A 5/16-inch thick solid sheet was removed from the Mylar tray in less than 8 minutes after mixing. This product had a density greater than 1 gram/cc, a Barcol Hardness (No. 934-1 tester) of about 25 and tensile strength of 8803 psi (618.85 kg/cm$^2$) at an elongation of 12%.

EXAMPLE 15

To 100 grams of Polyol F preheated to 105° C was added 60 grams of Polyisocyanate C maintained at room temperature. This rapidly stirred mixture, which had an NCO:OH ratio of about 0.87:1, was poured into a Mylar tray and was observed to solidify in less than 90 seconds after of mixing. This casting was found demoldable in about 90 seconds. The tensile strength of this resin product was found to be 8382 psi (598.25 kg/cm$^2$) at an elongation of 12%. The density was greater than 1 g/cc.

EXAMPLE 16

Blended 100 grams of Polyol A preheated to 102° C with 75 grams of Polyisocyanate A stored at 28° C. This blend, which had an NCO:OH ratio of 0.75:1, was poured into a Mylar tray. This mixture solidified within about 3 minutes after mixing and the resultant cast sheet was removed from the mold 6 minutes after mixing. The resultant clear sheet had a density than 1 g/cc and a Barcol Hardness (No. 934-1 tester) of 28.

EXAMPLE 17

Blended 50 grams of Polyol A preheated to 120° C with 75 grams of Polyisocyanate A stored at 28° C. This blend, which had an NCO:OH ratio of 1.5:1, was poured into a Mylar tray. This mixture solidified within 5 minutes after mixing and the resultant ¼-inch clear cast sheet was removed from the mold 9 minutes after mixing. The resultant sheet had a density greater than 1 g/cc and a Barcol Hardness (No. 934-1 tester) of 38.

EXAMPLE 18

50 grams of Polyisocyanate A preheated to a temperature of 56° C was blended with 50 grams of Polyol A preheated to a temperature of about 54° C resulting in a blend having a temperature of about 55° C. The mixture which had an NCO:OH ratio of 1:1 was poured into a 250 cc polyethylene beaker and 3 minutes after start of mixing, the temperature was 100° C, after 4 minutes the temperature was 120° C and the mixture solidified. After 5 minutes the temperature was 150° C, after 6 minutes the temperature was 175° C and after 7 minutes the temperature was 182° C. The resultant 1-inch thick cast slug was demolded within about 7½ minutes after start of mixing and had the following properties:

Density; >1 g/cc
Barcol Hardness (No. 934-1 tester) 37

EXAMPLE 19

The procedure of Example 18 was employed with the following components and results.

50 grams of Polyisocyanate A preheated to about 58° C
50 grams of Polyol A preheated to 56° C
NCO:OH ratio was 1.1.

Temperature of the blend was about 57° C and the blend was poured into a Mylar tray 45 seconds after start of mixing. The temperature profile was as follows with the time being measured from the start of mixing:

| Time, minutes | Temperature, ° C |
|---|---|
| 3 | 95 |
| 5 | 110 |
| 7 | 122 |

After 9 minutes, the mixture began to solidify and after 14 minutes, a 3/16-inch (0.48 cm) thick transparent casting was removed from the mold. The resultant casting had the following properties:

| Density | >1 g/cc |
|---|---|
| Barcol Hardner (#934-1 tester) | 34 |

COMPARATIVE EXPERIMENT B (diol employed with diisocyanate)

To 100 grams of Polyol E preheated to 137° C was added 6 grams of Polyisocyanate A maintained at room temperature. Poured this blend, which had an NCO:OH ratio of 1.03:1, into a Mylar tray and observed that the reaction exotherm reached 174° C in about 2 minutes after start of mixing. At 12 minutes after mixing the blend was a very viscous fluid. In about 24 hours after mixing, the casting was a sticky non-demoldable product.

COMPARATIVE EXPERIMENT C (polyol equivalent weight too high)

To 145 grams of Polyol G preheated to 121° C was added 50 grams of Polyisocyanate A stored at room temperature. This rapidly stirred mixture, which had an NCO:OH ratio of 0.92:1, was poured into a Mylar tray. About 20 hours later, the tray contents were still liquid.

COMPARATIVE EXPERIMENT D (aliphatic polyisocyanate)

Blended 100 grams of Polyol C preheated to 140° C with 70 grams of polyisocyanate E stored at room temperature. Then poured this rapidly stirred blend, which had an NCO:OH ratio of 1.02:1, into a Mylar tray. This casting was still liquid 30 minutes after start of mixing; no solidification occurred within 24 hours.

COMPARATIVE EXPERIMENT E (aliphatic polyisocyanate)

Blended 100 grams of Polyol C preheated to 140° C with 100 grams of Polyisocyanate F stored at room temperature. This rapidly stirred blend, which had an NCO:OH ratio of 1.22:1, was poured into a Mylar tray. Thirty minutes after start of mixing, the blend was still found to be a liquid. No solidification occurred within 24 hours.

COMPARATIVE EXPERIMENT F (aliphatic polyisocyanate)

Blended 100 grams of Polyol B stored at 125° C with 65 grams of Polyisocyanate G stored at room temperature. This blend, which had an NCO:OH ratio of 1.04:1, was poured into a Mylar tray. One hour after mixing the blend was still fluid. No solidification was observed within 24 hours.

COMPARATIVE EXPERIMENT G (NCO:OH ratio too low)

Blended 100 grams of Polyol A preheated to 104° C with 60 grams of Polyisocyanate A which was stored at 28° C. The blend, which had an NCO:OH ratio of 0.6:1, was poured into a mylar tray and was still a liquid 18 minutes after mixing and 25 minutes after mixing it was a soft taffy-like polymer which was not demoldable. Within 45 minutes after mixing, the resultant casting was found to be easily shattered upon demolding.

COMPARATIVE EXPERIMENT H (NCO:OH ratio too high)

Blended 50 grams of Polyol A preheated to 120° C with 100 grams of Polyisocyanate A stored at 28° C. Within 1, 2 and 3 minutes after mixing, the temperature of the mixture was 60° C, 80° C and 130° C, respectively. The blend which had an NCO:OH index of 2:1 was poured into a Mylar tray and was a viscous fluid 7 minutes after mixing and an undemoldable viscous taffy-like product 20 minutes after mixing. The product was weak and glass-like and easily fractured upon demolding 30 minutes after mixing.

COMPARATIVE EXPERIMENT I (exotherm temperature exceeded 200° C)

50 grams of Polyisocyanate A preheated to about 118° C was blended with 50 grams of Polyisocyanate B preheated to about 116° C resulting in a blend having a temperature of about 117° C. The blend which had an NCO:OH ratio of 1:1 was poured into a 250 cc polyethylene beaker and about 30 seconds after start of mixing, the mixture solidified and after 45 seconds the temperature was about 200° C, after 60 seconds, the temperature was about 260° C. Between the first and second minute after start of mixing, the 1-inch thick casting had started to swell, crack and develop bubbles. The density of the resultant casting was 0.73 g/cc.

COMPARATIVE EXPERIMENT J (temperature of blend below 50° C followed by heating mixture in a 105° C oven)

50 grams of Polyisocyanate A at 27° C was blended with 50 grams of Polyol A at 27° C. The blend which had an NCO:OH ratio of 1:1 was poured into a 250 cc Pyrex beaker and placed in an oven set at a temperature of about 105° C. The beaker and its contents were inspected over a period of time with the following observations.

| Time in 105° C oven (minutes) | Observations |
| --- | --- |
| 4 | contents of beaker still liquid |
| 8 | contents of beaker still liquid |
| 12 | contents of beaker still liquid |
| 16 | contents of beaker still liquid |
| 20 | contents of beaker still liquid |
| 22 | contents of beaker still liquid, temperature of mixture was determined to be 95° C and the mixture had separated into two distinct layers |
| 24 | contents of beaker still liquid |
| 25 | contents of beaker still liquid, stirred contents and a foam with large irregular cells was formed |
| 28 | form was still tacky, removed it from oven |

I claim:

1. A non-catalytic process for preparing rapid-setting polyurethanes having a density of at least about 1 g/cc and a percent elongation of less than about 100, and are demoldable within about 15 minutes, which process comprises:
   A. admixing in the absence of a catalyst for urethane formation a first liquid component containing a polyol free of nitrogen atoms and having from about 2 to about 8 hydroxyl groups per molecule and an OH equivalent weight of less than about 200 with a second liquid component containing an aromatic polyisocyanate having an average of at least about 2 NCO groups per molecule with the proviso that when said first liquid component contains a polyol having an average of less than about 2.5 hydroxyl groups per molecule, then said second component contains an aromatic polyisocyanate or mixture of such polyisocyanates wherein the average number of NCO groups per molecule is at least about 2.5;
   B. placing the resultant mixture into a suitable mold wherein said mixture solidifies within about 15 minutes to a solid having a density of at least about 1 g/cc and an elongation of less than about 100; and
   C. Subsequently demolding the resultant article from the mold; wherein the temperature of said first and second component at the time of mixture is such that the temperature of the resultant mixture is at least about 50° C and is sufficient to provide a peak exotherm temperature of at least about 85° C and less than about 200° C and wherein said first and and second components are admixed in such proportions that the resultant NCO:OH equivalent ratio is from about 0.75:1 to about 1.5:1.

2. The process of claim 1 wherein said first liquid component has a hydroxyl equivalent weight of from about 50 to about 150 and said first and second liquid components are present in quantities so as to provide an NCO:OH equivalent ratio of from about 0.90:1 to about 1.2:1 and the resultant mixture has a maximum exotherm temperature of at least about 100° C.

3. The process of claim 2 wherein said first liquid component contains dipropylene glycol and said second liquid component contains polymethylene polyphenylisocyanate.

4. The process of claim 2 wherein sais first liquid component contains a glycerine initiated polyoxypropylene polyol and said second liquid component is an 80/20 mixture of 2,4-/2,6-toluene diisocyanate.

5. The process of claim 2 wherein said mixture additionally contains a liquid modifier compound which has a boiling point of at least about 150° C.

6. The process of claim 2 wherein said mold is that of a machine component.

7. The process of claim 2 wherein said mold is that of a decorative object.

8. The process of claim 2 wherein said mold is that of a furniture component.

* * * * *